(12) United States Patent
Togino

(10) Patent No.: US 6,590,724 B2
(45) Date of Patent: Jul. 8, 2003

(54) COLOR IMAGE DISPLAY SYSTEM AND COLOR IMAGE PICKUP SYSTEM THAT USE DECENTERED OPTICAL SYSTEM

(75) Inventor: Takayoshi Togino, Koganei (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/810,178

(22) Filed: Mar. 19, 2001

(65) Prior Publication Data

US 2001/0033440 A1 Oct. 25, 2001

(30) Foreign Application Priority Data

Mar. 17, 2000 (JP) ........................................ 2000-075186
Feb. 6, 2001 (JP) ........................................ 2000-029006

(51) Int. Cl.[7] .............................................. G02B 5/04
(52) U.S. Cl. ..................... 359/833; 359/631; 359/637; 348/267
(58) Field of Search ................................ 359/831, 833, 359/630, 631, 633, 637; 348/222, 207.99, 264, 266, 267, 273, 280; 353/30, 31, 33

(56) References Cited

U.S. PATENT DOCUMENTS 5,798,792 A * 8/1998 Kusaka et al. ............... 348/264
5,936,773 A * 8/1999 Togino ........................ 359/630
6,195,125 B1 * 2/2001 Udagawa et al. ........... 348/222

FOREIGN PATENT DOCUMENTS

JP          6-347708         12/1994

* cited by examiner

*Primary Examiner*—Euncha Cherry
(74) *Attorney, Agent, or Firm*—Pillsbury Winthrop LLP

(57) ABSTRACT

A color image display system and a color image pickup system adapted to electronically correct the color shift of color separation images caused by a decentered optical system used to display or capture a color image. The color image display system has an image display apparatus including a color image display device for displaying a color image composed of color separation images superimposed on one another. The displayed color image is projected into an eyeball of an observer through a viewing optical system that is formed from a decentered optical system including a decentered prism having at least a decentered internally reflecting surface with a power, together with an entrance surface and an exit surface, which are transmitting surfaces. The pixel position of each color separation image to be displayed on the color image display device is shifted so as to cancel a color shift of the corresponding color separation image caused by the decentered optical system.

6 Claims, 15 Drawing Sheets

COLOR IMAGE DISPLAY SYSTEM AND COLOR IMAGE PICKUP SYSTEM THAT USE DECENTERED OPTICAL SYSTEM

This application claims benefit of Japanese Applications No. 2000-75186 filed in Japan on Mar. 17, 2000 and No. 2001-29006 filed in Japan on Feb. 6, 2001, the contents of which are incorporated by this reference.

BACKGROUND

1. Field of the Invention

The present invention relates to a color image display system and a color image pickup system that use a decentered optical system. More particularly, the present invention relates to a color image display system and a color image pickup system which are adapted to electronically correct decentration chromatic aberration introduced by a decentered optical system used to display or capture a color image.

2. Description of Related Art

Various decentered optical systems have been proposed by the present applicant and so forth. The basic structure of these decentered optical systems is an optical system including one or a plurality of decentered prisms having an internally reflecting surface with a power, e.g. a rotationally asymmetric surface, decentered with respect to an optical axis. Because the reflecting and transmitting surfaces of the optical system are decentered, various decentration aberrations occur. To correct the decentration aberrations, the optical system uses at least one rotationally asymmetric surface.

Meanwhile, to correct the lateral chromatic aberration of an optical system, Japanese Patent Application Unexamined Publication (KOKAI) No. Hei-347708 proposed to display images of different colors on an image display device at respective magnifications made different from each other so that the lateral chromatic aberration is corrected.

In a decentered optical system formed from reflecting and transmitting surfaces as stated above, the reflecting surface does not produce chromatic aberration, but the entrance or exit surface of the decentered prism, which is a transmitting surface, produces not only lateral chromatic aberration but also a color shift by the dispersing prism action.

When the number of pixels of an image display device or an image pickup device is relatively small, the amount of color shift is small relative to the size of the pixels. Therefore, the color shift presents no problem. However, in the case of using an image display device or an image pickup device having a large number of pixels to provide high resolution, an image of red color and an image of blue color are viewed or captured displaced relative to each other. Thus, the resolution degrades unfavorably.

The present invention was made in view of the above-described problems with the prior art. Accordingly, an object of the present invention is to provide a color image display system and a color image pickup system, which are adapted to electronically correct the color shift of color separation images caused by a decentered optical system used to display or capture a color image.

To attain the above-described object, the present invention provides a color image display system using a decentered optical system. The color image display system has an image display apparatus including a color image display device for displaying a color image composed of color separation images superimposed on one another. The color image displayed on the color image display device is projected into an eyeball of an observer through a viewing optical system. The viewing optical system is formed from a decentered optical system including a decentered prism having at least a decentered internally reflecting surface with a power, together with an entrance surface and an exit surface, which are transmitting surfaces, respectively.

In the image display apparatus, the pixel position of each color separation image to be displayed on the color image display device is shifted so as to cancel a color shift of the corresponding color separation image caused by the decentered optical system.

In this case, it is preferable that the color image display device be arranged to display each color separation image by a set of scanning lines in the horizontal scanning direction, and that the pixel position be shifted only in the direction of the scanning lines. With this arrangement, no field memory is needed, and the electronic circuit can be simplified in structure. At the same time, it becomes possible to correct more than half of lateral chromatic aberration occurring in the optical system.

If the plane of symmetry of the decentered prism and the direction of the scanning lines are set parallel to each other, it becomes possible to correct a color shift due to the decentration of the decentered prism by producing a color shift in the direction of the scanning lines. In a case where the color image display device has a laterally long image display area with a ratio of 16:9, in particular, the lateral direction of the image display area should preferably be set parallel to the plane of symmetry of the decentered prism. By doing so, even more advantageous effects can be obtained.

In addition, the present invention provides a color image pickup system using a decentered optical system. The color image pickup system has an image pickup apparatus including a color image pickup device for capturing a color image and outputting color separation image signals. An image pickup optical system forms an object image on the color image pickup device. The image pickup optical system is formed from a decentered optical system including a decentered prism having at least a decentered internally reflecting surface with a power, together with an entrance surface and an exit surface, which are transmitting surfaces, respectively.

In the image pickup apparatus, the pixel position of each color separation image signal outputted from the color image pickup device is shifted so as to cancel a color shift of the corresponding color separation image caused by the decentered optical system.

The operation of the present invention will be described below.

In a decentered optical system, tilted optical surfaces are formed from rotationally asymmetric surfaces to fold an optical path, thereby allowing the optical system to be constructed in a compact form. If the optical system is formed from a decentered prism and a surface having an optical power is formed from an internally reflecting surface (back-coated mirror) of the decentered prism, it is possible to construct an optical system free from chromatic aberration, in particular.

Such an internally reflecting surface produces no chromatic aberration in theory. However, because the optical path is bent, the amount of decentration aberrations produced increases. The decentration aberrations can be corrected by a rotationally asymmetric surface.

In such a decentered prism, at least two transmitting surfaces are present, i.e. an entrance surface through which light enters the prism, and an exit surface through which light exits the prism. Chromatic aberration produced by the entrance and exit surfaces cannot be corrected unless another optical system is used. The reason for this is that because the reflecting surface does not produce chromatic aberration, there is no surface capable of correcting the chromatic aberration produced by the transmitting surfaces.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DETAILED DESCRIPTION

The following is a description of examples of the color image display system and the color image pickup system, which use a decentered optical system, according to the present invention.

Figure 1:
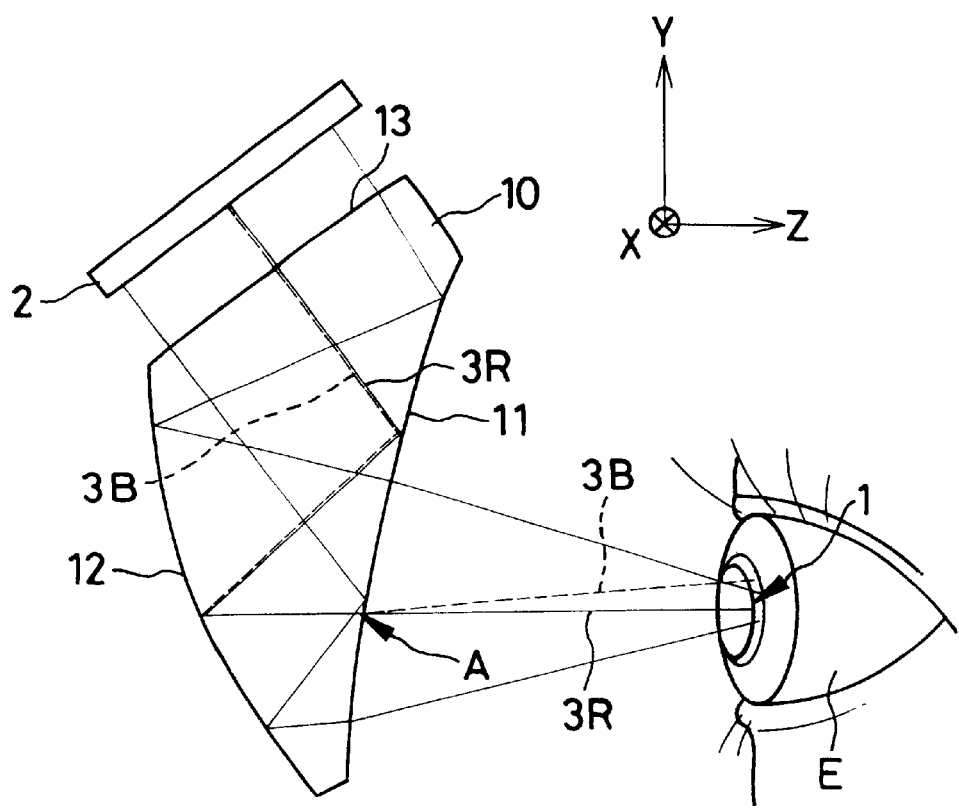
FIG. 1 is a diagram for describing chromatic aberration occurring in an image display apparatus using a decentered optical system.

FIG. 1 is a diagram schematically showing an optical system of a head-mounted image display apparatus, for example, in which such a decentered prism is used as a viewing optical system to display a color image displayed on a color image display device in an eyeball of an observer as an enlarged image. In the example shown in FIG. 1, a decentered prism 10 constituting the viewing optical system has three surfaces: a third surface 13 forming an entrance surface facing a color image display device 2; a second surface 12 as an internally reflecting surface; and a first surface 11 serving as both an exit surface facing an exit pupil 1 of the viewing optical system and an internal totally reflecting surface (surface Nos. are given on the assumption that rays are traced by backward ray tracing). Display light from the color image display device 2 enters the prism 10 while being refracted through the third surface 13. The light is incident on the first surface 11 at an incident angle not less than the critical angle and thus totally reflected from the first surface 11 and then internally reflected by the second surface 12 which is a rotationally asymmetric surface having a positive power. The reflected light is incident on the first surface 11 at an incident angle smaller than the critical angle and thus refracted by the first surface 11, whereby an enlarged image of the color image displayed on the color image display device 2 is displayed in an eyeball E of an observer whose pupil is placed at the position of the exit pupil 1.

In FIG. 1, an axial principal ray 3R of red color and an axial principal ray 3B of blue color, which emanate from the center of the display area of the color image display device 2, are subjected to the dispersion of the material constituting the decentered prism 10 at a point A where the rays 3R and 3B exit from the first surface 11 of the decentered prism 10. As a result, the ray 3B of blue color is refracted at a larger angle than the refraction angle of the ray 3R of red color because the refractive index for blue color is higher than that for red color. Thus, the ray 3B of blue color exits the decentered prism 10 as shown by the dashed line in the figure.

Although the above discussion is given of a color image display apparatus, the same chromatic aberration occurs in a case where the decentered prism 10 is used as an image pickup optical system (objective optical system), and the color image display device 2 is replaced with a color image pickup device to capture an image of an object present in front of an entrance pupil provided at the position of the exit pupil 1.

Accordingly, the system of the present invention is provided with a chromatic aberration producing device whereby chromatic aberrations, particularly lateral chromatic aberration and color shift, as produced by the entrance and exit surfaces of the decentered prism of the decentered optical system are electronically produced in advance on a color image display device for displaying a color image composed of color separation images superimposed on one another. That is, the electronic chromatic aberration producing device previously introduces a color shift into each color separation image such as to cancel chromatic aberration produced in the decentered optical system.

Figure 2A:
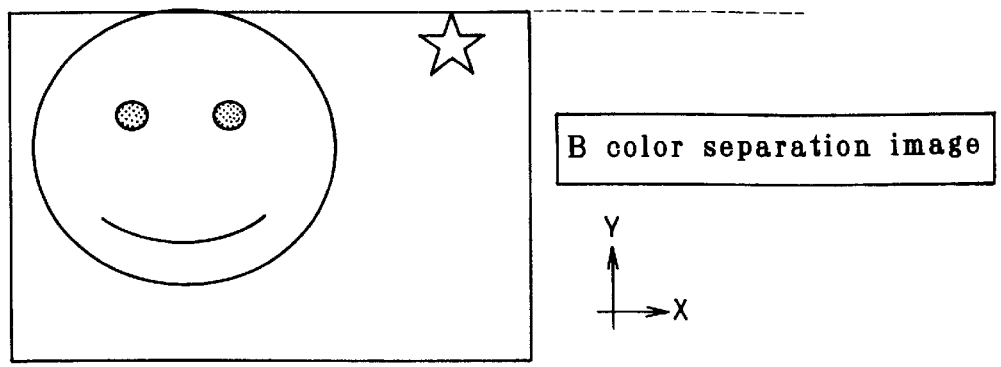
FIG. 2 is a diagram for describing the principle of the color image display system according to the present invention.
Figure 2B:
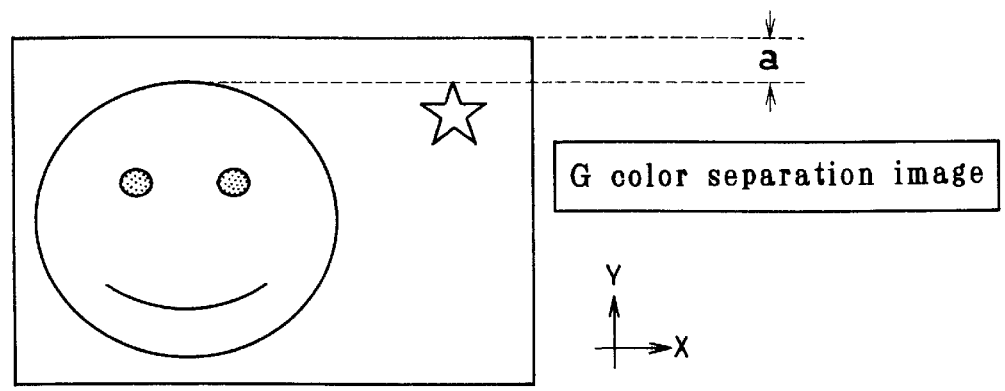
Figure 2C:
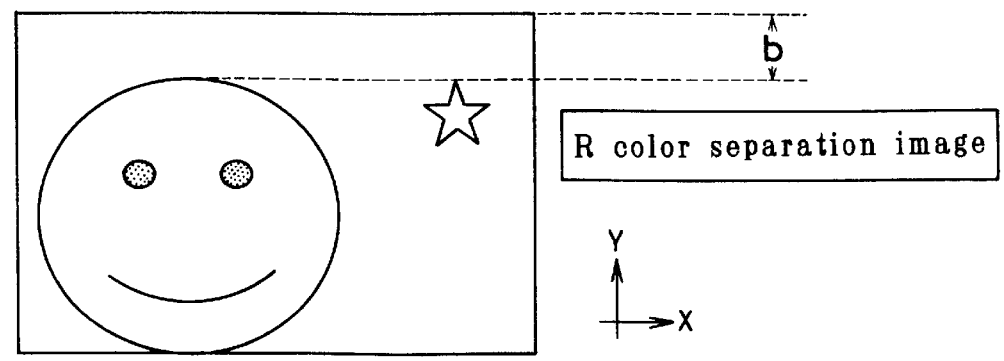

This will be explained below with reference to the schematic view of FIG. 2. Parts (a) to (c) of FIG. 2 show a blue (B) color separation image, a green (G) color separation image and a red (R) color separation image, respectively, which are displayed superimposed on one another on the color image display device 2 in FIG. 1. The rectangular outer edge of each image corresponds to the outer edge of the display area of the color image display device 2. When B of display light is used as the reference, if the amount of color shift in the Y direction on the display area of the color image display device 2 is +a for G and +b for R, as shown in parts (b) and (c) of FIG. 2, the G color separation image is displayed with a displacement a in the −Y direction with respect to the B color separation image in part (a) of FIG. 2, and the R color separation image is displayed with a displacement b in the −Y direction with respect to the B color separation image in part (a) of FIG. 2. Consequently, there is no color shift among the R, G and B color separation images when viewed through the decentered prism 10 of the viewing optical system.

In FIG. 2, it is assumed that a uniform color shift is present throughout the image field. In actuality, however, the amount of shift differs for each position in the image field in general. Therefore, it is necessary to vary the amount of shift according to the position (pixel position) of each color separation image.

The color image pickup apparatus is also provided with a chromatic aberration correcting device for electronically giving deformation to color separation image signals outputted from the color image pickup device such as to cancel chromatic aberration produced by the entrance and exit surfaces of the decentered prism in the decentered optical system, particularly lateral chromatic aberration and color shift. The electronic chromatic aberration correcting device gives a color shift to each color separation image signal such as to cancel chromatic aberration produced in the decentered optical system.

Figure 3:
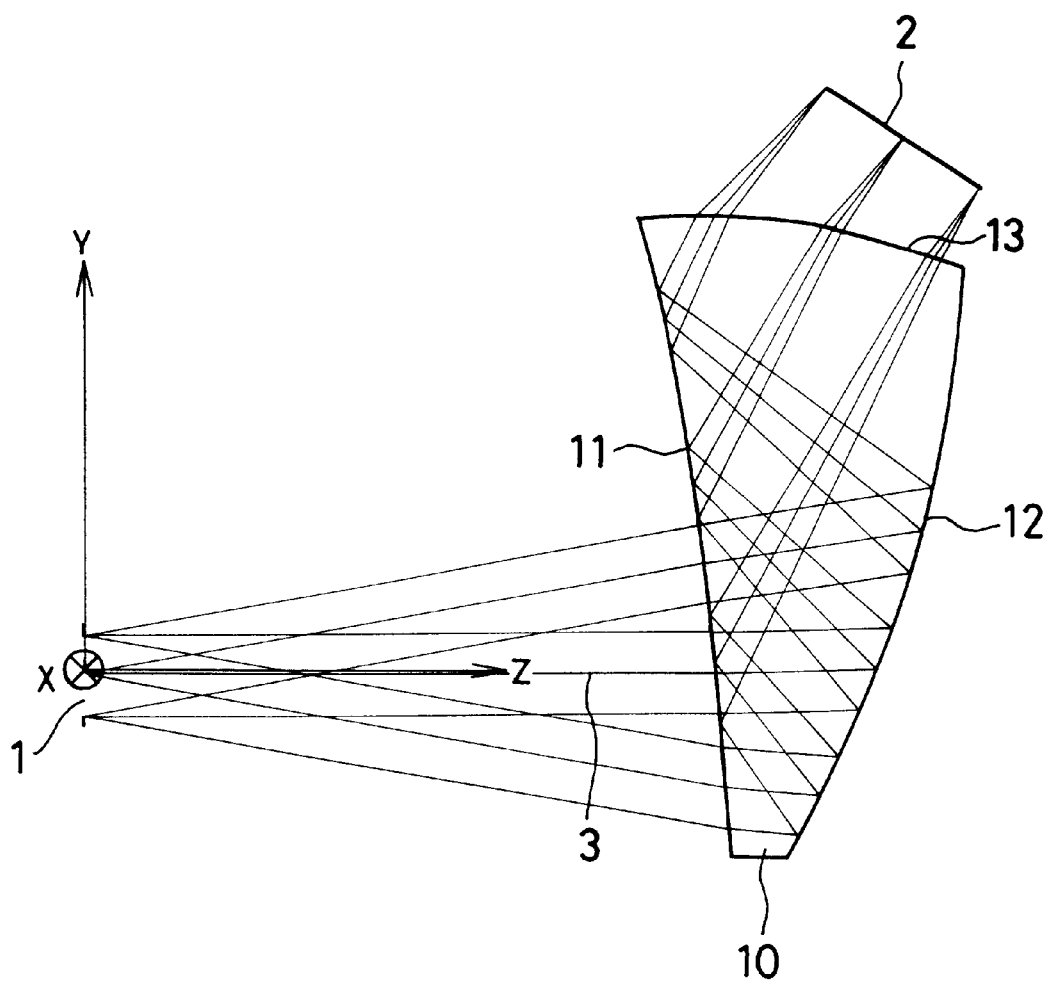
FIG. 3 is a sectional view showing a specific example of a decentered prism usable as a viewing optical system or an image pickup optical system.

FIG. 3 shows a specific example of a decentered prism similar to that shown in FIG. 1, which is usable as a viewing optical system or an image pickup optical system. The decentered optical system as arranged in the form of a viewing optical system will be described below.

Constituent parameters in the backward ray tracing of the optical system in the numerical example will be shown later. Regarding the constituent parameters in the backward ray tracing, as shown in FIG. 3, an axial principal ray (optical axis) 3 is defined by a light ray passing through the center of an exit pupil 1 of the optical system at right angles thereto and reaching the center of a color image display device 2. In the backward ray tracing, the center of the pupil 1 is defined as the origin of decentered optical surfaces of a decentered optical system. A Z-axis is taken in the direction of the axial principal ray 3, and the direction in which the Z-axis extends from the pupil 1 toward a first surface 11 of the optical system is defined as a positive direction of the Z-axis. A plane containing the Z-axis and the center of the image display device 2 is defined as a YZ-plane. An axis extending through the origin at right angles to the YZ-plane is defined as an X-axis, and the direction in which the X-axis extends from the obverse side toward the reverse side of the plane of the figure is defined as a positive direction of the X-axis. An axis that constitutes a right-handed orthogonal coordinate system in combination with the X- and Z-axes is defined as a Y-axis.

In the decentered prism 10 according to the specific example, decentration of each surface is made in the YZ-plane, and the one and only plane of symmetry of each rotationally asymmetric free-form surface is the YZ-plane.

Regarding decentered surfaces, each surface is given displacements in the X-, Y- and Z-axis directions (X, Y and Z, respectively) of the vertex position of the surface from the origin of the above-described coordinate system, and tilt angles (degrees) of the center axis of the surface [the Z-axis of the following equation (a) in regard to free-form surfaces; the Z-axis of the following equation (b) in the case of aspherical surfaces] with respect to the X-, Y- and Z-axes ($\alpha$, $\beta$ and $\gamma$, respectively) In this case, the positive $\alpha$ and $\beta$ mean counterclockwise rotation relative to the positive directions of the corresponding axes, and the positive $\gamma$ means clockwise rotation relative to the positive direction of the Z-axis.

Among optical functional surfaces constituting the optical system, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the following equation (a). The Z-axis of the defining equation is the axis of the free-form surface.

$$Z = cr^2 / \left[1 + \sqrt{\{1 - (1+k)c^2 r^2\}}\right] + \sum_{j=2}^{66} C_j X^m Y^n \qquad (a)$$

In Eq. (a), the first term is a spherical surface term, and the second term is a free-form surface term.

In the spherical surface term:

$c$: the curvature at the vertex $k$: a conic constant $r = \sqrt{(X^2 + Y^2)}$

The free-form surface term is given by $$\sum_{j=2}^{66} C_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$

-continued $$C_{20}XY^4 + C_{21}Y^5 + C_{22}X^6 + C_{23}X^5Y + C_{24}X^4Y^4 + C_{25}X^3Y^3 +$$
$$C_{26}X^2Y^4 + C_{27}XY^5 + C_{28}Y^6 + C_{29}X^7 + C_{30}X^6Y + C_{31}X^5Y^2 +$$
$$C_{32}X^4Y^3 + C_{33}X^3Y^4 + C_{34}X^2Y^5 + C_{35}XY^6 + C_{36}Y^7 \ldots$$

where $C_j$ (j is an integer of 2 or higher) are coefficients.

In general, the above-described free-form surface does not have planes of symmetry in both the XZ- and YZ-planes. However, a free-form surface having only one plane of symmetry parallel to the YZ-plane is obtained by making all terms of odd-numbered degrees with respect to X zero. A free-form surface having only one plane of symmetry parallel to the XZ-plane is obtained by making all terms of odd-numbered degrees with respect to Y zero.

Aspherical surfaces are rotationally symmetric aspherical surfaces given by the following equation:

$$Z=(Y^2/R)/[1+\{1-(1+K)Y^2/R^2\}^{1/2}]+AY^4+BY^6+CY^8+DY^{10}+ \quad (b)$$

In the above equation, Z is an optical axis (axial principal ray) for which the direction of travel of light is defined as a positive direction, and Y is taken in a direction perpendicular to the optical axis. R is a paraxial curvature radius, K is a conic constant, and A, B, C, D . . . are 4th-, 6th-, 8th- and 10th-order aspherical coefficients, respectively. The Z-axis of this defining equation is the axis of the rotationally symmetric aspherical surface.

It should be noted that those terms concerning free-form surfaces and aspherical surfaces for which no data is shown are zero. The refractive index is expressed by the refractive index for the spectral d-line (wavelength: 587.56 nanometers). Lengths are given in millimeters.

Constituent parameters in the backward ray tracing of the above-described numerical example will be shown below. The observation field angles in this example are as follows. The horizontal field angle is 20°, and the vertical field angle is 15.060. The pupil diameter is 4 mm. Regarding the effective pupil diameter, 12 mm is ensured for the Y direction, and 4 mm for the X direction. Thus, a wide exit pupil is ensured. It should be noted that in the table below, "FFS" denotes a free-form surface, and "ASS" denotes an aspherical surface, and further "RE" denotes a reflecting surface.

Numerical Example

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS(1) | | (1) | 1.5254 | 56.2 |
| 3 | FFS(1) (RE) | | (2) | 1.5254 | 56.2 |
| 4 | ASS(1) (RE) | | (1) | 1.5254 | 56.2 |
| 5 | FFS(2) | | (3) | | |
| Image plane | ∞ | | (4) | | |

ASS(1)
R −81.11
K 0.0000
A 5.9034 × 10⁻⁶
B −3.7831 × 10⁻⁹
C 1.3339 × 10⁻¹²

-continued

Numerical Example

FFS(1)
| | | | | | |
|---|---|---|---|---|---|
| $C_4$ | −9.8138 × 10⁻³ | $C_6$ | −8.2514 × 10⁻³ | $C_8$ | −2.7778 × 10⁻⁶ |
| $C_{10}$ | 3.8358 × 10⁻⁵ | $C_{11}$ | 3.8755 × 10⁻⁷ | $C_{13}$ | −9.8315 × 10⁻⁷ |
| $C_{15}$ | 7.8388 × 10⁻⁷ | $C_{17}$ | −1.3309 × 10⁻⁸ | $C_{19}$ | −1.7127 × 10⁻⁷ |
| $C_{21}$ | −1.2681 × 10⁻⁷ | | | | |

FFS(2)
| | | | | | |
|---|---|---|---|---|---|
| $C_4$ | −9.0107 × 10⁻⁴ | $C_6$ | −7.5268 × 10⁻³ | $C_8$ | −3.3323 × 10⁻⁴ |
| $C_{10}$ | −1.8614 × 10⁻³ | $C_{11}$ | −8.7467 × 10⁻⁵ | $C_{13}$ | 1.2789 × 10⁻⁴ |
| $C_{15}$ | 9.1989 × 10⁻⁵ | | | | |

Displacement and tilt (1)
| X | 0.00 | Y | 16.18 | Z | 28.54 |
|---|---|---|---|---|---|
| α | 12.20 | β | 0.00 | γ | 0.00 |

Displacement and tilt (2)
| X | 0.00 | Y | 4.69 | Z | 40.33 |
|---|---|---|---|---|---|
| α | −16.95 | β | 0.00 | γ | 0.00 |

Displacement and tilt (3)
| X | 0.00 | Y | 20.61 | Z | 39.44 |
|---|---|---|---|---|---|
| α | 73.02 | β | 0.00 | γ | 0.00 |

Displacement and tilt (4)
| X | 0.00 | Y | 25.65 | Z | 39.98 |
|---|---|---|---|---|---|
| α | 57.49 | β | 0.00 | γ | 0.00 |

Figure 4:
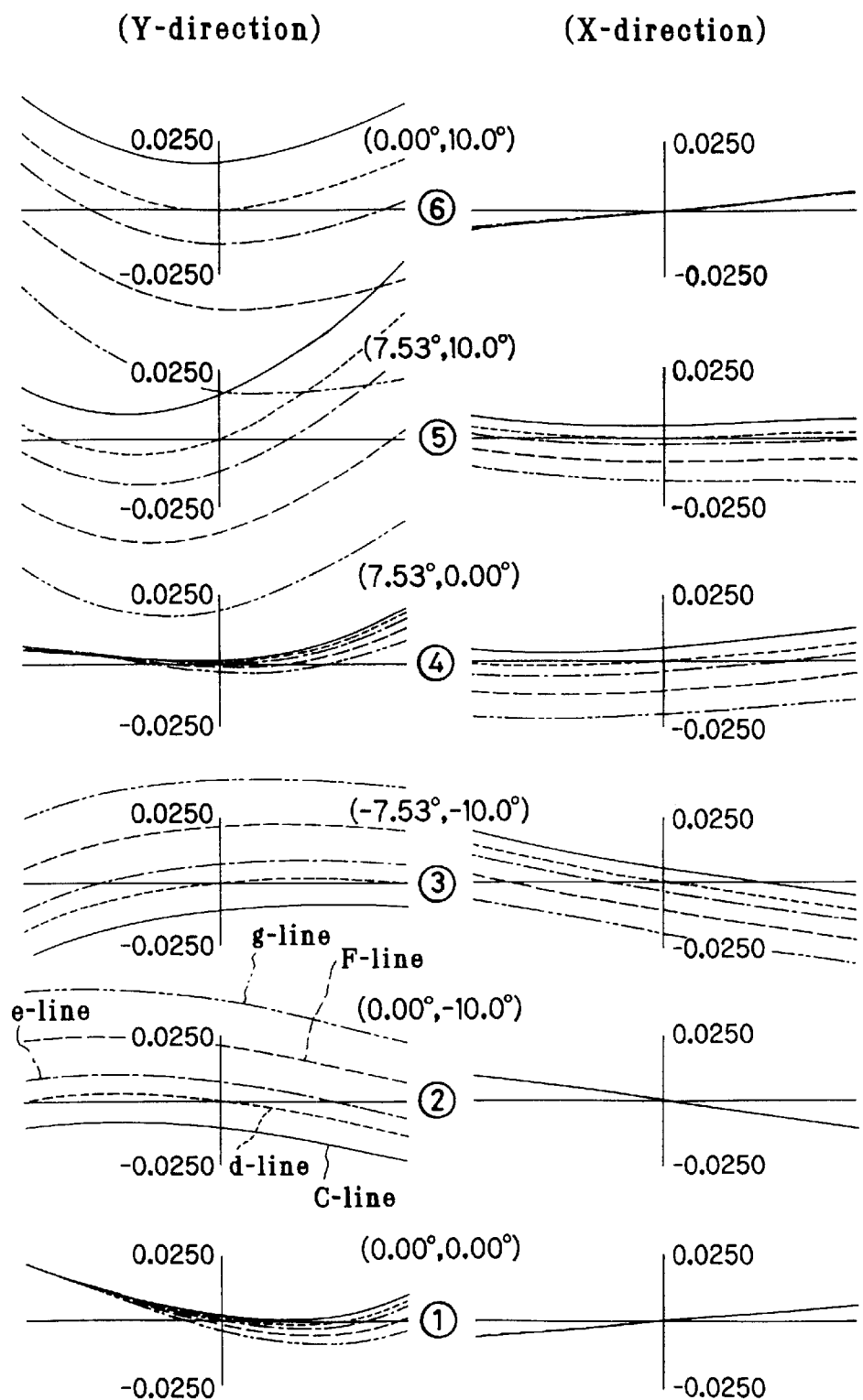
FIG. 4 is an aberrational diagram showing lateral aberrations in the specific example shown in FIG. 3.
Figure 5:
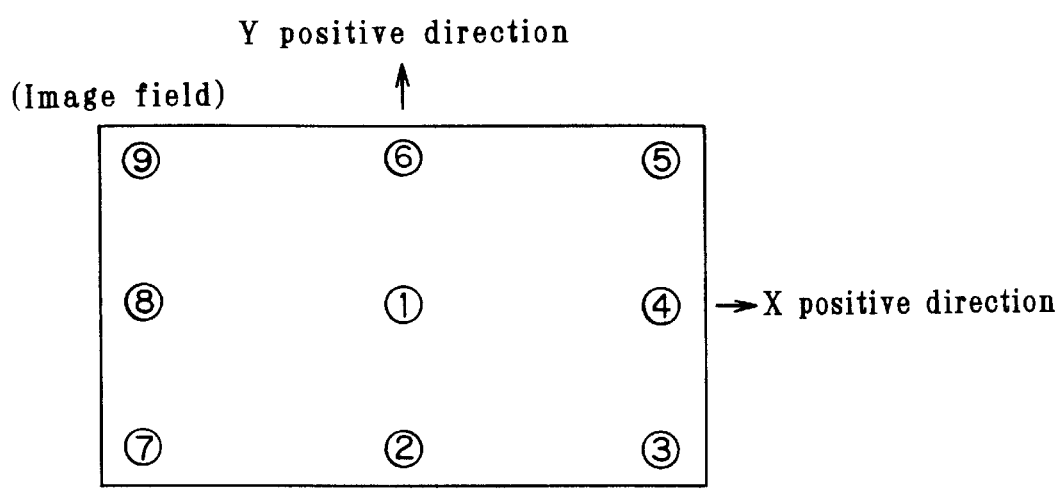
FIG. 5 is a diagram for describing the definition of positions in an image field.

FIG. 4 is an aberrational diagram showing lateral aberrations in the above-described numerical example. In the diagram showing lateral aberrations, the numerals in the parentheses denote (horizontal field angle, vertical field angle), and lateral aberrations at the field angles are shown. It should be noted that the image field is assumed to be a laterally long rectangle as shown in FIG. 5, and the vertical direction of the image field is defined as a Y direction in which the upward direction is defined as a Y positive direction, and further the horizontal direction of the image field is defined as an X direction in which the rightward direction is defined as a X positive direction. In the image field, nine positions are defined as follows: The center of the image field is defined as (1); the horizontal center of the lower edge of the image field is defined as (2); the lower-right corner of the image field is defined as (3); the vertical center of the right-hand edge of the image field is defined as (a; the upper-right corner of the image field is defined as (5); the horizontal center of the upper edge of the image field is defined as (6); the lower-left corner of the image field is defined as (7); the vertical center of the left-hand edge of the image field is defined as (8); and the upper-left corner of the image field is defined as (9). In FIG. 4, (1) to (6) are lateral aberrations at positions (1) to (6) in FIG. 5.

Chromatic aberrations in the X and Y directions in the above-described numerical example at positions (1) to (9) in the image field shown in FIG. 5 are as follows.

| Wavelength (nm) | | 656.28 | 587.56 | 486.13 |
|---|---|---|---|---|
| (1) | X | 0 | 0 | 0 |
| | Y | 0.0011 | 0 | −0.0026 |
| (2) | X | 0 | 0 | 0 |
| | Y | −4.4819 | −4.4715 | −4.4490 |

-continued

| Wavelength (nm) | | 656.28 | 587.56 | 486.13 |
|---|---|---|---|---|
| ③ | X | 3.3118 | 3.3064 | 3.2948 |
|   | Y | −4.4752 | −4.4648 | −4.4422 |
| ④ | X | 3.3578 | 3.3524 | 3.3407 |
|   | Y | 0.0010 | 0.0001 | −0.0019 |
| ⑤ | X | 3.3495 | 3.3452 | 3.3358 |
|   | Y | 4.5264 | 4.5096 | 4.4728 |
| ⑥ | X | 0 | 0 | 0 |
|   | Y | 4.4901 | 4.4720 | 4.4327 |
| ⑦ | X | −3.3118 | −3.3064 | −3.2948 |
|   | Y | −4.4752 | −4.4648 | −4.4422 |
| ⑧ | X | −3.3578 | −3.3524 | −3.3407 |
|   | Y | 0.0010 | 0.0001 | −0.0019 |
| ⑨ | X | −3.3495 | −3.3452 | −3.3358 |
|   | Y | 4.5264 | 4.5096 | 4.4728 |

At the position ① on the image display device 2 corresponding to the center of the image field, for example, the pixel of 656.28 nm (R) is displayed previously displaced from the original position by 0.0011 mm=1.1 μm in the Y positive direction. The pixel of 486.13 nm (B) is displayed previously displaced from the original position by 2.6 μm in the Y negative direction. The pixel of 587.56 nm (G) is displayed without being displaced in any direction. By doing so, it becomes possible to view an image free from chromatic aberration at the center of the image field.

At the position ③ on the image display device 2 corresponding to the lower-right corner of the image field, for example, the pixel of 656.28 nm (R) is displayed previously displaced from the original position by 3.3118 mm in the X direction and by −4.4752 mm in the Y direction. The pixel of 587.56 nm (G) is displayed previously displaced from the original position by 3.3064 mm in the X direction and by −4.4648 mm in the Y direction. The pixel of 486.13 nm (B) is displayed previously displaced from the original position by 3.2948 mm in the X direction and by −4.4422 mm in the Y direction. By doing so, it becomes possible to view an image free from chromatic aberration at the lower-right corner of the image field.

At other field angles also, an observation image free from chromatic aberration can be viewed by previously displacing the pixels of R, B and G on the basis of the values shown in the table above. Regarding positions between the above-described positions ① to ⑨, color shifts in the X and Y directions should be calculated in advance for each of the positions. Alternatively, color shifts at such positions may be obtained by interpolation. To remove only color shifts, the pixels may be displayed as follows. The pixels of 587.56 nm (G) are not displaced, but displacements in the X and Y directions of pixels of 656,28 nm (R) and 486.13 nm (B) with respect to the wavelength of G are calculated, and the pixels of 656.28 nm (R) and 486.13 nm (B) are displayed previously displaced by the calculated amounts of displacement.

To perform an image pickup operation by replacing the color image display device 2 with a color image pickup device, correction is performed to shift the pixel positions of R, G and B color separation image signals obtained from the image pickup device so as to cancel color shifts in the X and Y directions of the corresponding R, G and B color separation images as shown in the table above, which are caused by the decentered prism 10.

Regarding the color separation image signal of 656.28 nm (R) at the position ③ corresponding to the lower-right corner of the image field, for example, a pixel away from the position ③ by 3.3118 mm in the X direction and by −4.4752 mm in the Y direction is shifted to the position ③. Regarding the color separation image signal of 587.56 nm (G), a pixel away from the position ③ by 3.3064 mm in the X direction and by −4.4648 mm in the Y direction is shifted to the position ③. Regarding the color separation image signal of 486.13 nm (B), a pixel away from the position ③ by 3.2948 mm in the X direction and by −4.4422 mm in the Y direction is shifted to the position ③. By doing so, it becomes possible to obtain an image free from chromatic aberration at the lower-right corner of the image field. In this case also, when image distortion need not be corrected but only color shifts are to be corrected, the pixels may be shifted as follows. The pixels of 587.56 nm (G) are not shifted, but displacements in the X and Y directions of the pixels of 656.28 nm (R) and 486.13 nm (B) with respect to the wavelength (G) are calculated, and the pixels of 656.28 nm (R) and 486.13 nm (B) are shifted by the calculated amounts of displacement.

Figure 6:
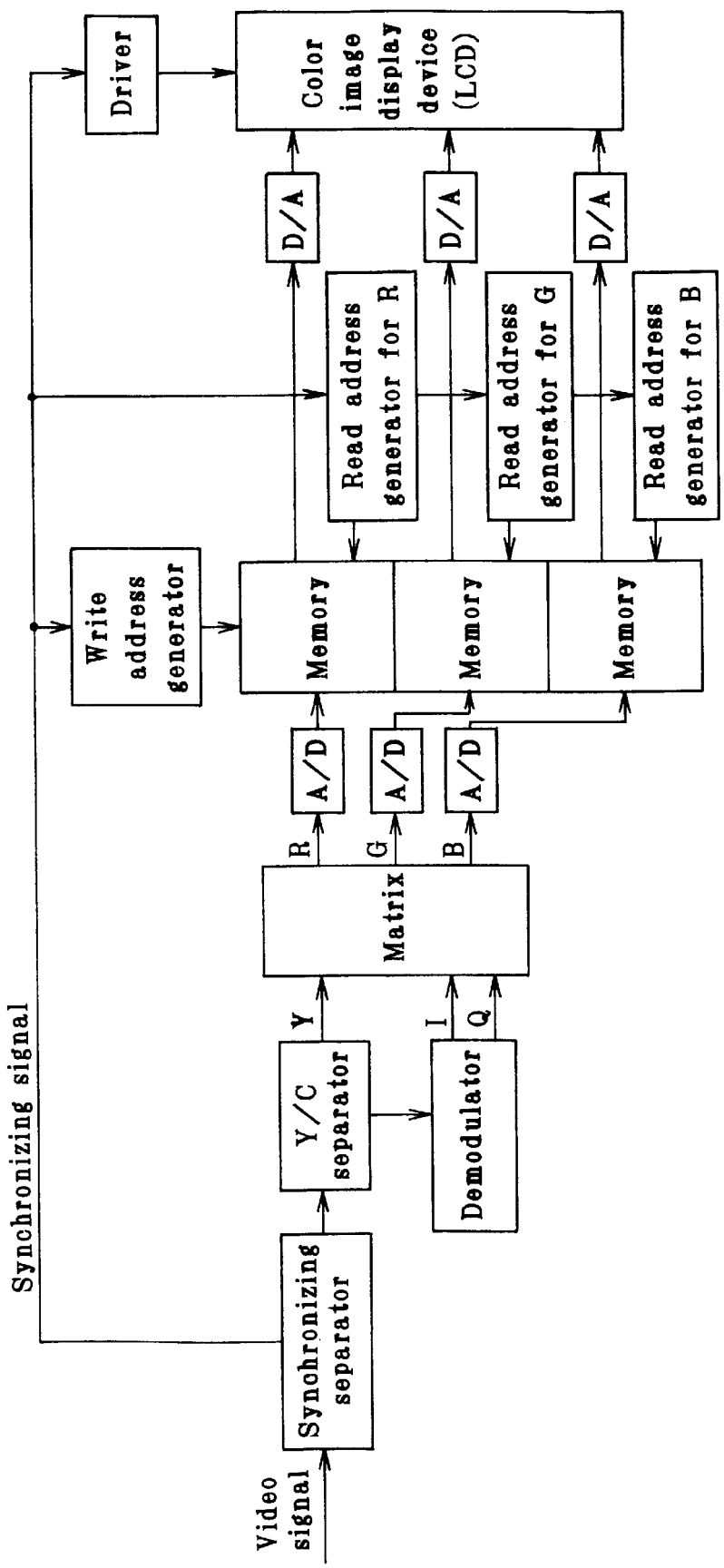
FIG. 6 is a block diagram showing an example of a circuit whereby R, G and B color separation images corrected for color shift are displayed on a color image display device.

FIG. 6 is a block diagram showing an example of a circuit whereby R, G and B color separation images corrected for color shift are displayed on a color image display device as stated above. A composite video signal is separated into a synchronizing signal and a video signal in a synchronizing separator circuit. The separated video signal is passed through a Y/C separator, a demodulator and a matrix circuit and thus separated into signals R, G and B. The signals R, G and B are A/D converted and stored into memories, respectively. Memory addresses where the signals R, G and B are written are generated in a write address generator circuit from the synchronizing signal. When the signals R, G and B are to be read out from the memories, read addresses are generated from the synchronizing signal in respective read address generator circuits so that pixels are shifted in accordance with color shifts of R, G and B. Pieces of read data are D/A converted and inputted to a color image display device (LCD: Liquid Crystal Display) on which the R, G and B color separation images are displayed. Thus, the pixel positions of the R, G and B color separation images can be freely changed when the color separation images are displayed on the color image display device. Therefore, it is possible to correct decentration chromatic aberration introduced by a decentered optical system used as a viewing optical system. It should be noted that the gist of the present invention is to change the pixel position of each color separation image to be displayed on a color image display device so as to cancel decentration chromatic aberration introduced by a decentered optical system. Therefore, the block diagram of FIG. 6 is merely an example.

Figure 7:
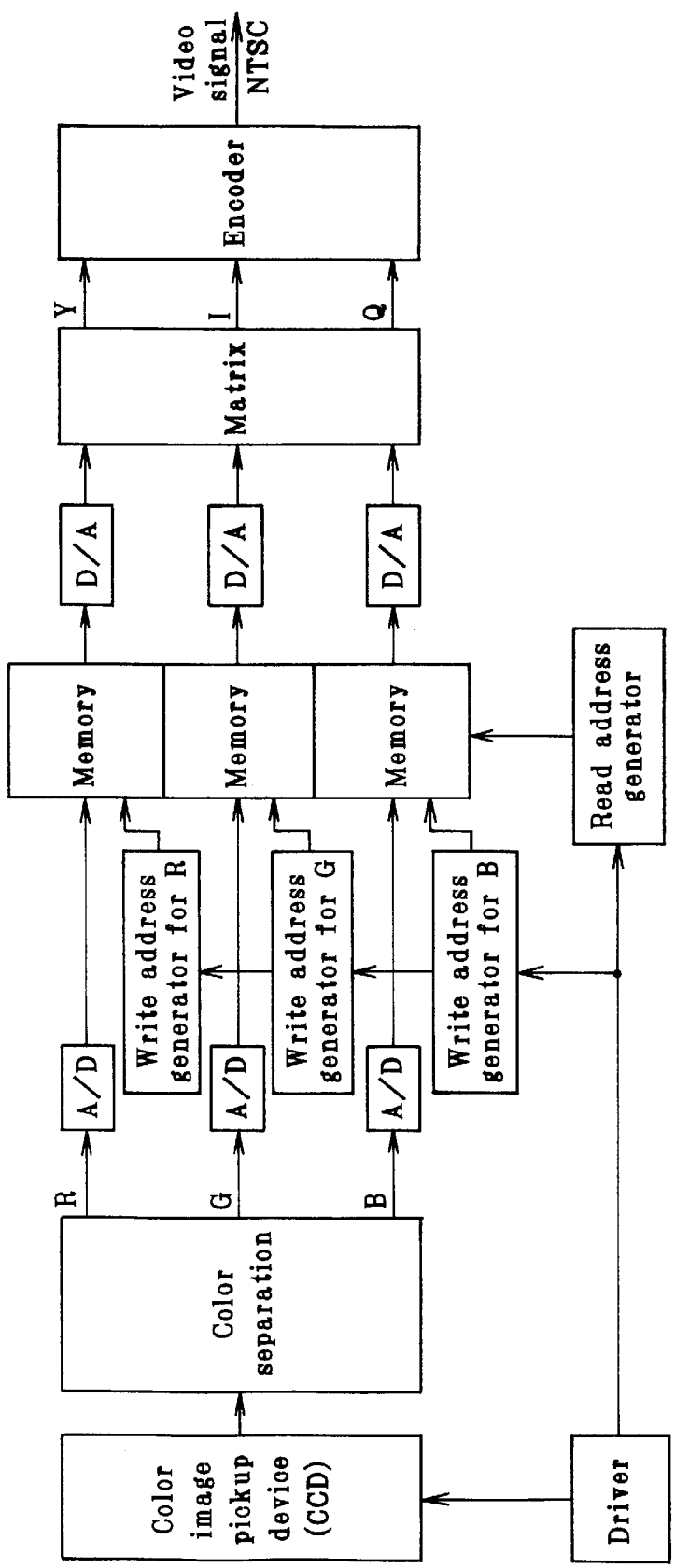
FIG. 7 is a block diagram showing an example of a circuit whereby R, G and B color separation image signals outputted from a color image pickup device are corrected for color shift at pixel positions and outputted as a video signal.

FIG. 7 is a block diagram showing an example of a circuit whereby R, G and B color separation image signals outputted from a color image pickup device are corrected for color shift at pixel positions and outputted as a video signal. An image pickup signal outputted from a color image pickup device (CCD) is separated into R, G and B color separation image signals in a color separation circuit. The signals R, G and B are A/D converted and stored into memories, respectively. At this time, memory addresses where the signals R, G and B are written are generated in respective write address generator circuits from a driver signal so as to shift pixels in accordance with color shifts of the colors. When the signals R, G and B are to be read out from the memories, read addresses are generated from the driver signal in a read address generator circuit. Pieces of read data are D/A converted, passed through a matrix circuit and outputted as a video signal, e.g. an NTSC video signal, through an encoder. The block diagram of FIG. 7 is merely an example. The present invention is also applicable to circuits arranged in conformity to other systems.

Figure 8:
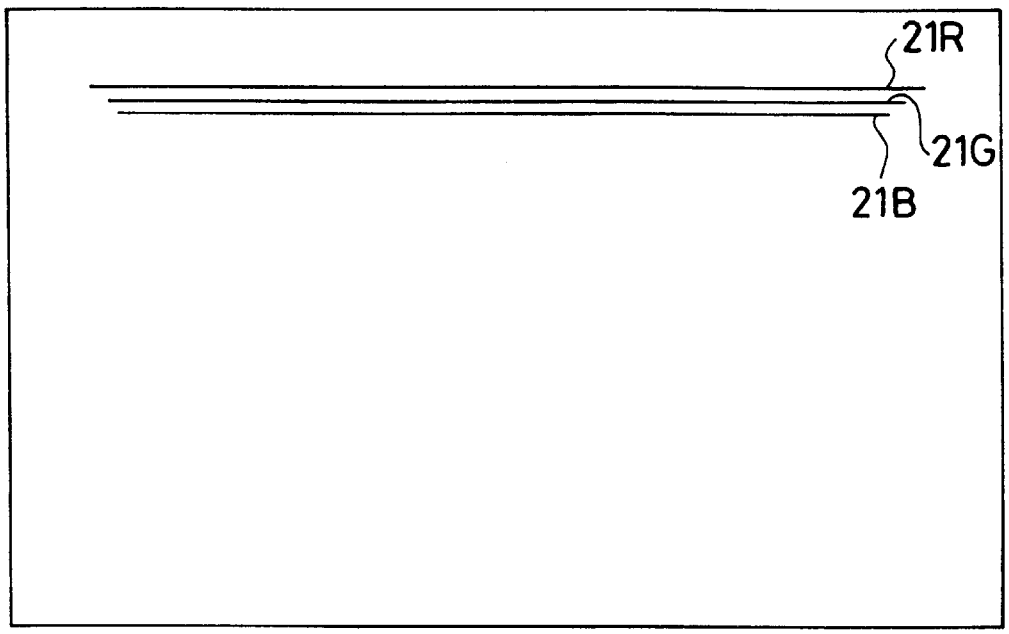
FIG. 8 is a diagram schematically showing scanning lines in the image display area of a color image display device in a case where color shift in a one-dimensional direction is corrected by the length of scanning lines.

As will be clear from the aberrational diagram of FIG. 4, in the case of a decentered prism 10 such as that shown in FIG. 1, color shifts occur to a considerable extent in the Y direction parallel to the YZ-plane, which is the plane of symmetry of the decentered prism 10. In such a case, the direction of the horizontal scanning lines of the color image display device 2 is set parallel to the Y direction, and, as shown in FIG. 8, the display contents of the scanning lines 21R, 21G and 21B for the R, G and B color separation images are displayed with different display lengths on a scanning line at the same vertical scanning position in the image display area of the color image display device 2, whereby the display contents of the color separation images are made different from each other in size in the scanning line direction. The display magnification for each color separation image is set so as to compensate for the lateral chromatic aberration of the decentered prism 10, in which chromatic aberration remains. Consequently, the lateral chromatic aberrations cancel each other only in the scanning line direction when R, G and B color separation images are viewed. Accordingly, it becomes possible to view an observation image free from chromatic blur with a simple electronic circuit.

Figure 9:
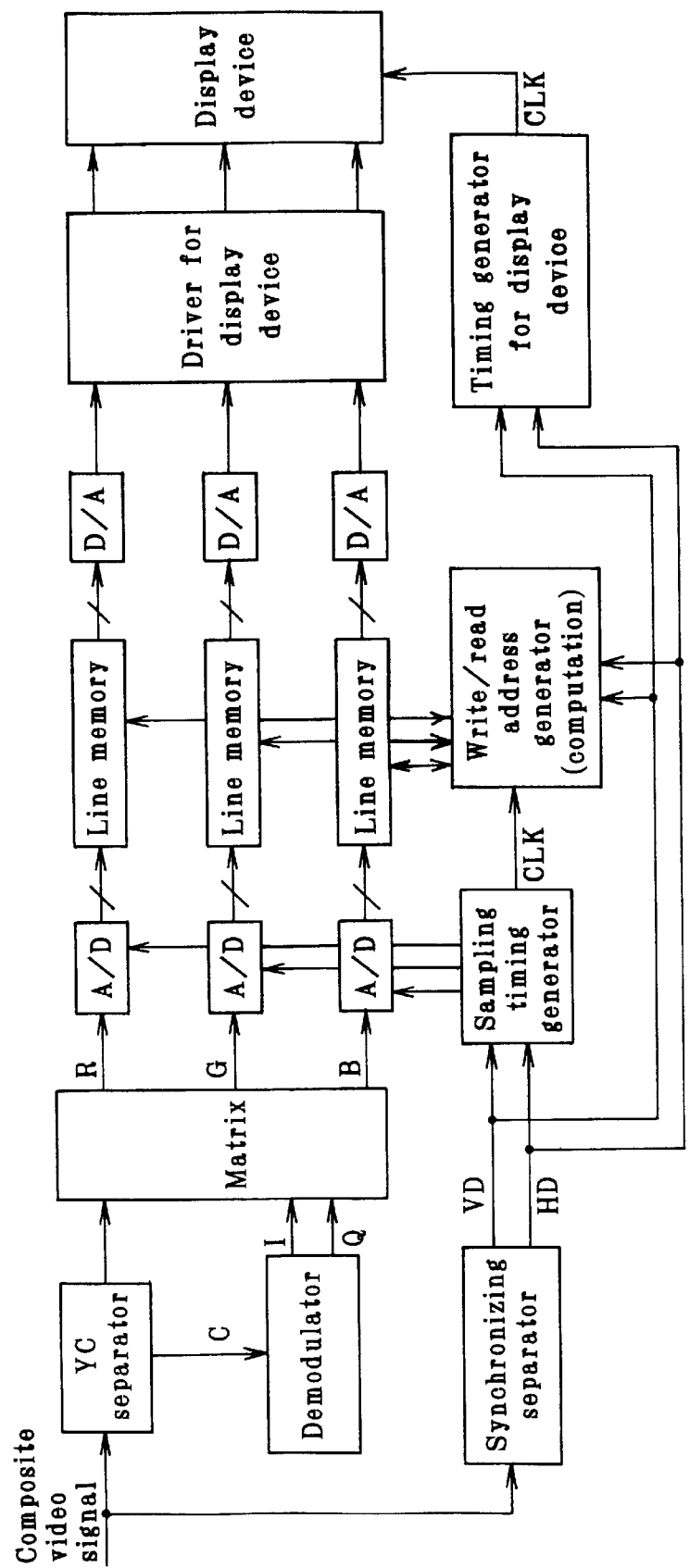
FIG. 9 is a block diagram showing one example of a circuit usable in the system shown in FIG. 8 to output color separation images corrected for color shift.

FIG. 9 shows an example of a block diagram of a circuit arranged to display color separation images in such a manner as to compensate for color shift on a color image display device only in the horizontal direction as stated above. A composite video signal is passed through a Y/C separator, a demodulator and a matrix circuit and thus separated into signals R, G and B. Meanwhile, a synchronizing signal is generated from the composite vide signal in a synchronizing separator circuit. The separated signals R, G and B are A/D converted, respectively. At this time, a sampling timing generator circuit generates an A/D conversion sampling timing for each of R, G and B so as to produce such an image as to correct chromatic aberration. The sampled signals R, G and B are stored into respective color line memories. When the signals R, G and B are to be read out from the color line memories, reading is performed at the same timing by a write/read address generator circuit. Pieces of read data are D/A converted and inputted to a color image display device (LCD: Liquid Crystal Display) on which the R, G and B color separation images are displayed. This system is limited to a case where the video input signal is analog.

The above-described system may be replaced by a system in which the sampling timing generator circuit generates an A/D conversion sampling timing so that the signals R, G and B are A/D converted at the same timing. When the signals R, G and B are to be read out, R, G and B pixel data is obtained from the pixels in the horizontal direction by performing computation in the write/read address generator circuit so as to produce such an image as to correct chromatic aberration. The R, G and B pixel data is D/A converted and inputted to the color image display device (LCD: Liquid Crystal Display) on which the R, G and B color separation images are displayed. With this system, the video input signal may be either analog or digital. It should be noted that this system allows a general PLL-incorporating 3-channel A/D converter (one chip) to be used because the signals R, G and B are subjected to A/D conversion at the same sampling timing. Therefore, it is possible to reduce costs and to minimize the substrate area.

Figure 10:
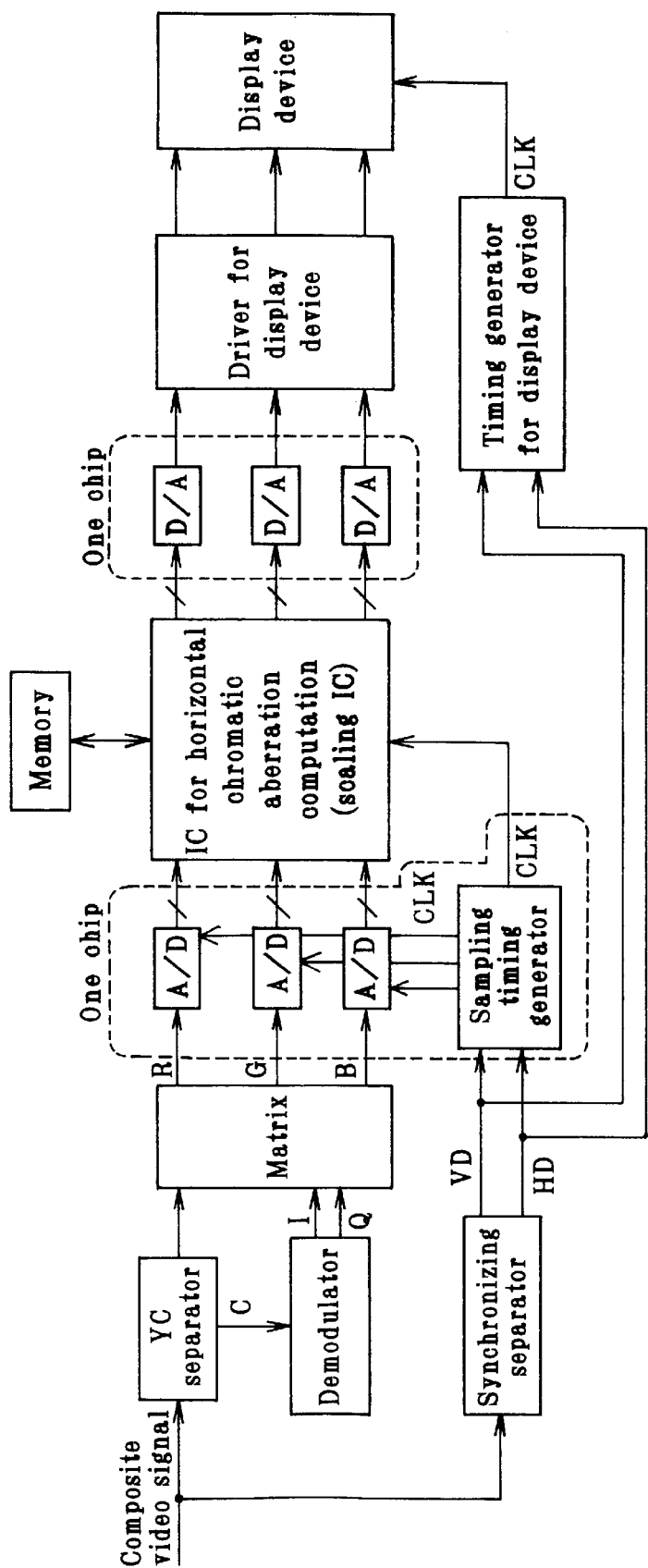
FIG. 10 is a block diagram showing another example of a circuit usable in the system shown in FIG. 8 to output color separation images corrected for color shift.

There may be cases where the use of a single small-capacity DRAM and a DSP (digital signal processor) for computation is less costly than the use of several line memories as in FIG. 9. In a case where it is necessary to enlarge an image in a horizontal and/or vertical direction from the functional viewpoint of the goods and an IC (scaling IC) therefor is provided, a horizontal chromatic aberration computing function can be incorporated into the IC. By doing so, it is possible to simultaneously perform two processing operations, i.e. image scaling, and horizontal chromatic aberration correction. Thus, it is possible to achieve cost reduction of the IC and to share the use of an external memory. FIG. 10 is a block diagram showing a system arranged as stated above. The scaling IC serves as an IC capable of computing horizontal chromatic aberration as well. There is no basic difference between the systems shown in FIGS. 9 and 10.

In FIG. 10, to correct chromatic aberration also in the vertical direction as in the case of FIG. 6, the scaling IC is arranged to incorporate not only a horizontal chromatic aberration computing function but also a vertical chromatic aberration computing function, and a frame memory is used as the external memory. Regarding the computing method, chromatic aberration correction computation for each of the colors R, G and B is performed not only for lines but also for pixels in the vertical direction.

Incidentally, the decentered prism 10 for a viewing optical system or an image pickup optical system usable in the color image display system or the color image pickup system according to the present invention is not necessarily limited to the type of prism shown in FIGS. 1 and 3. Some examples of prisms usable as the decentered prism 10 will be described below with reference to FIGS. 11 to 18. The following description will be given on the assumption that each prism is used in an image pickup optical system.

Figure 11:
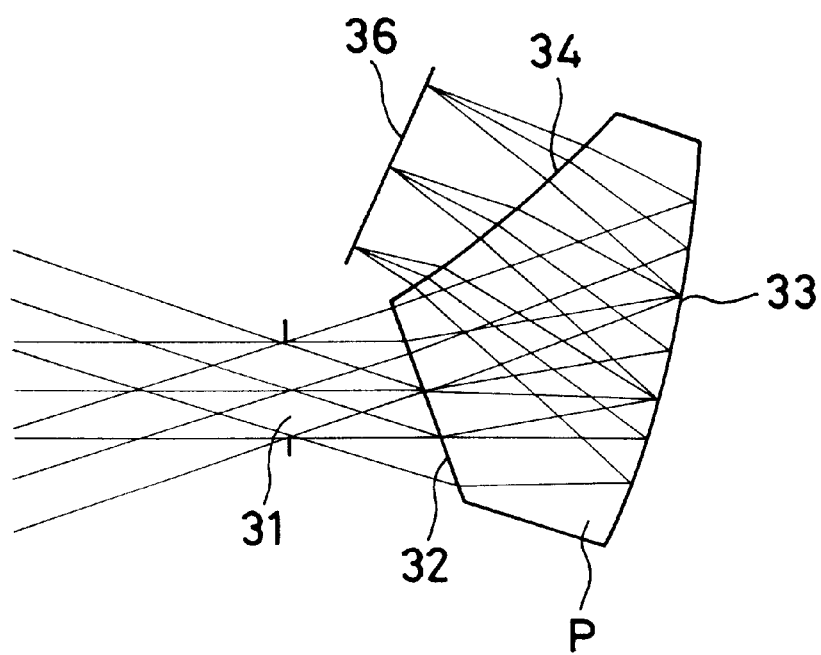
FIG. 11 is a diagram showing one example of a decentered prism for a viewing optical system or an image pickup optical system used in the color image display system or the color image pickup system according to the present invention.
Figure 12:
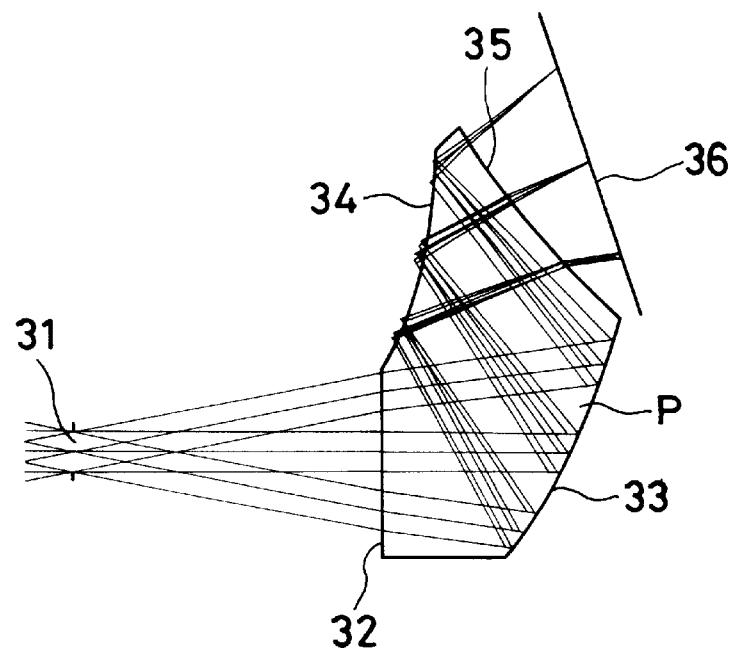
FIG. 12 is a diagram showing another example of a decentered prism for a viewing optical system or an image pickup optical system used in the color image display system or the color image pickup system according to the present invention.

In the case of FIG. 11, a prism P has a first surface 32, a second surface 33, and a third surface 34. Incident light passing through an entrance pupil 31 enters the prism P while being refracted through the first surface 32. The incident light is internally reflected by surface 32, a second surface 33, a third surface 34, and a fourth surface 35. Incident light passing through an entrance pupil 31 enters the prism P while being refracted through the first surface 32. The incident light is internally reflected by the second surface 33 and further internally reflected by the third surface 34. The reflected light is refracted by the fourth surface 35 to form an image on an image plane 36.

Figure 13:
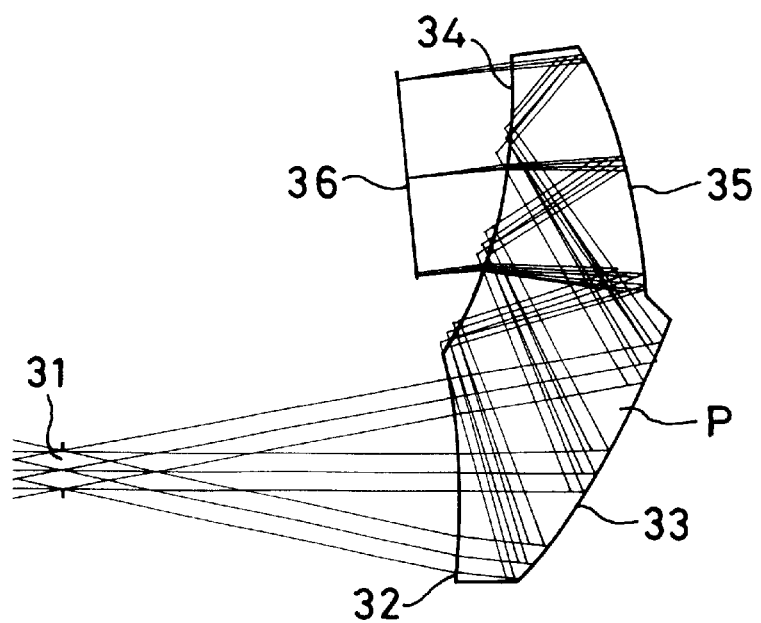
FIG. 13 is a diagram showing another example of a decentered prism for a viewing optical system or an image pickup optical system used in the color image display system or the color image pickup system according to the present invention.

In the case of FIG. 13, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and then totally reflected by the third surface 34. The reflected light is internally reflected by the fourth surface 35 and then refracted by the third surface 34 to form an image on an image plane 36.

Figure 14:
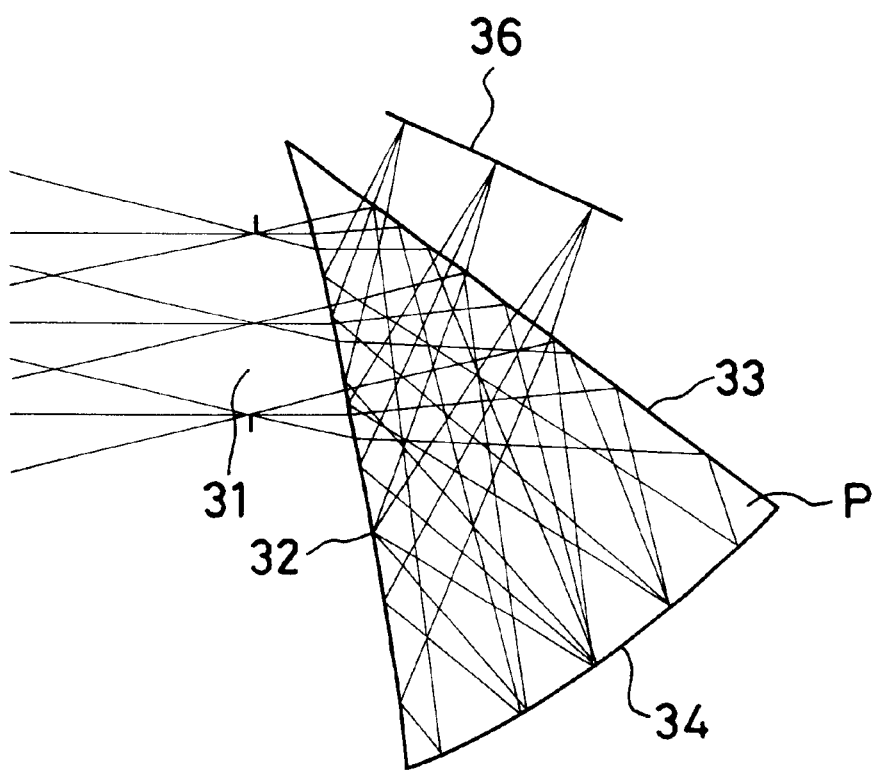
FIG. 14 is a diagram showing another example of a decentered prism for a viewing optical system or an image pickup optical system used in the color image display system or the color image pickup system according to the present invention.

In the case of FIG. 14, a prism P has a first surface 32, a second surface 33, and a third surface 34. Incident light passing through an entrance pupil 31 enters the prism P while being refracted through the first surface 32. The incident light is internally reflected by the second surface 33 and further internally reflected by the third surface 34. The reflected light is totally reflected by the first surface 32 and then refracted by the second surface 33 to form an image on an image plane 36.

Figure 15:
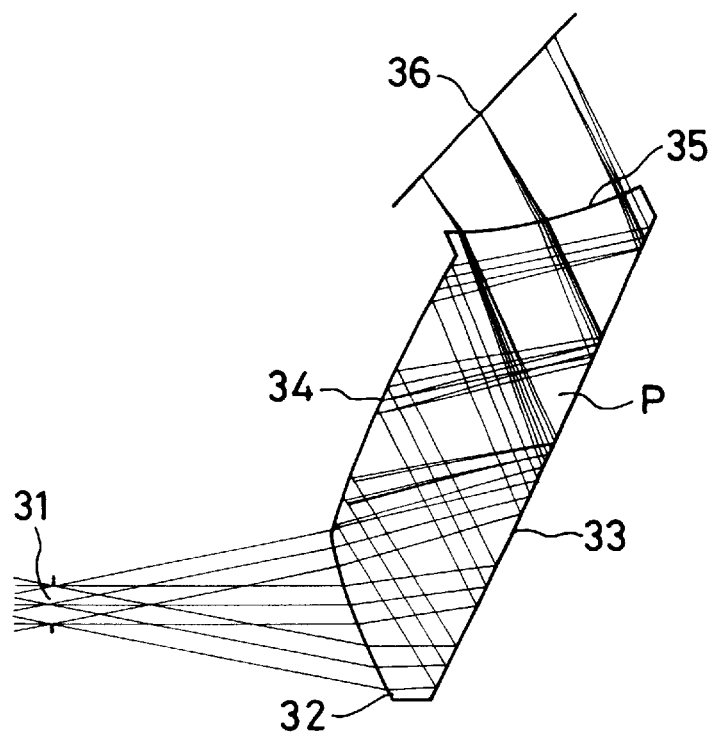
FIG. 15 is a diagram showing another example of a decentered prism for a viewing optical system or an image pickup optical system used in the color image display system or the color image pickup system according to the present invention.

In the case of FIG. 15, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and further internally reflected by the third surface 34. The reflected light is further internally reflected by the second surface 33 and then refracted by the fourth surface 35 to form an image on an image plane 36.

Figure 16:
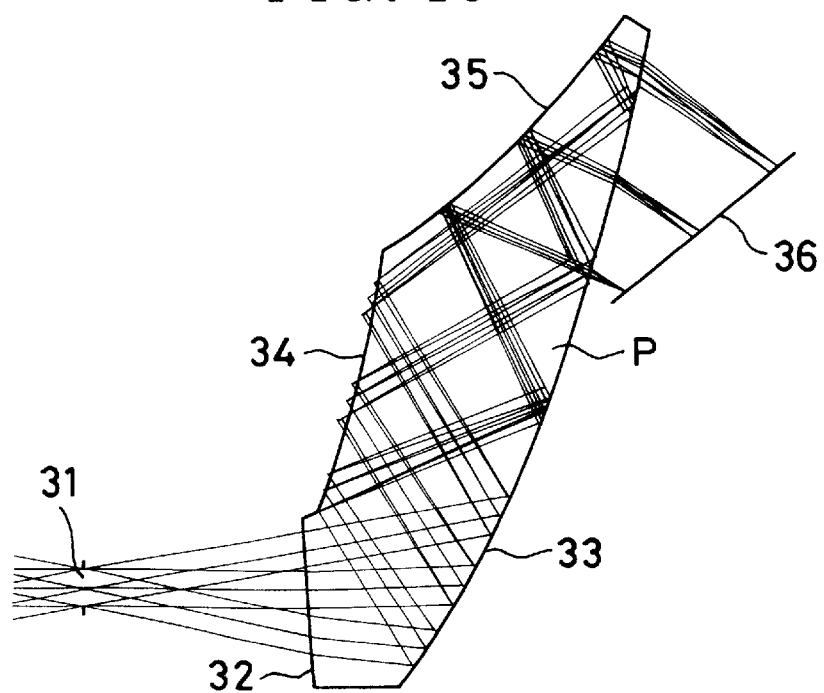
FIG. 16 is a diagram showing another example of a decentered prism for a viewing optical system or an image pickup optical system used in the color image display system or the color image pickup system according to the present invention.

In the case of FIG. 16, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and further internally reflected by the third surface 34. The reflected light is further internally reflected by the second surface 33 and then internally reflected by the fourth surface 35. The reflected light is then refracted by the second surface 33 to form an image on an image plane 36.

Figure 17:
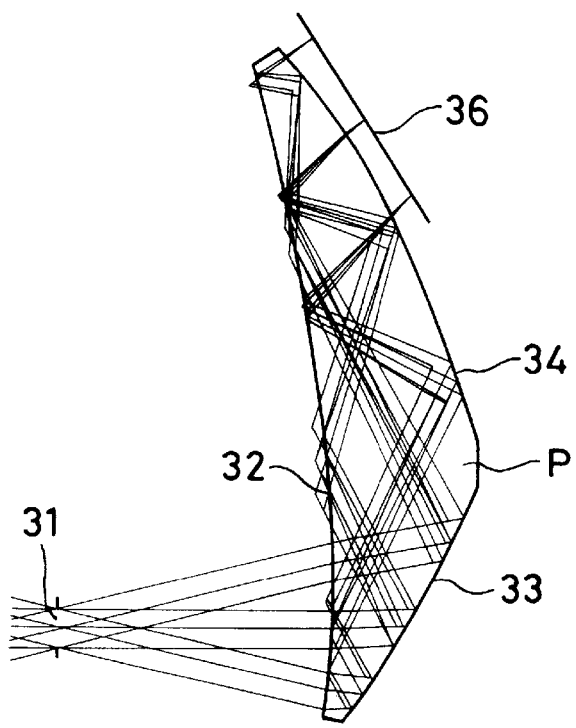
FIG. 17 is a diagram showing another example of a decentered prism for a viewing optical system or an image pickup optical system used in the color image display system or the color image pickup system according to the present invention.

In the case of FIG. 17, a prism P has a first surface 32, a second surface 33, and a third surface 34. Incident light passing through an entrance pupil 31 enters the prism P while being refracted through the first surface 32. The incident light is internally reflected by the second surface 33 and then totally reflected by the first surface 32. The reflected light is internally reflected by the third surface 34 and then totally reflected by the first surface 32. Then, the reflected light is refracted by the third surface 34 to form an image on an image plane 36.

Figure 18:
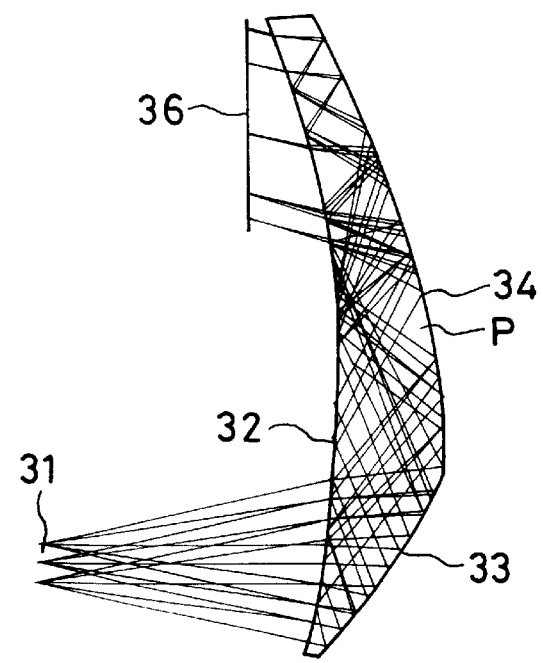
FIG. 18 is a diagram showing another example of a decentered prism for a viewing optical system or an image pickup optical system used in the color image display system or the color image pickup system according to the present invention.

In the case of FIG. 18, a prism P has a first surface 32, a second surface 33, and a third surface 34. Incident light passing through an entrance pupil 31 enters the prism P while being refracted through the first surface 32. The incident light is internally reflected by the second surface 33 and then totally reflected by the first surface 32. The reflected light is internally reflected by the third surface 34 and then totally reflected by the first surface 32. The reflected light is internally reflected by the third surface 34 and then refracted by the first surface 32 to form an image on an image plane 36.

It should be noted that the foregoing prisms are merely examples, and various publicly known decentered prisms are usable. Further, the present invention is also applicable to a decentered optical system including a combination of a plurality of such prisms integrated into one unit or separated from each other. It should be noted that the present invention is also applicable to a rotationally symmetric optical system.

According to the present invention, the pixel position of each color separation image to be displayed on a color image display device is shifted so as to cancel a color shift of the corresponding color separation image caused by a decentered optical system. Alternatively, the pixel position of each color separation image signal outputted from a color image pickup device is shifted so as to cancel a color shift of the corresponding color separation image caused by a decentered optical system. Therefore, even when the number of pixels of the image display device or the image pickup device is increased to provide high resolution, there is no possibility that an image of red color and an image of blue color will be viewed or captured displaced relative to each other, causing resolution degradation.

What I claim is:

1. A color image display system comprising:
    a viewing optical system for forming an image of said color image displayed on the color image display device on an observer side; and
    control means for shifting a pixel position of each color separation image to be displayed on said color image display device so as to cancel a color shift of the corresponding color separation image caused by a decentered optical system, wherein
        said viewing optical system includes a decentered prism having at least a decentered, internally reflecting surface with a power, together with an entrance surface and an exit surface, which are transmitting surfaces, respectively, and
        said control means varies an amount of shift for each color separation image.

2. A color image display system according to claim 1, wherein said color image display device is arranged to display each color separation image by a set of scanning lines in a horizontal scanning direction, and said pixel position is shifted only in the direction of said scanning lines.

3. A color image display system according to claim 2, wherein a plane of symmetry of said decentered prism and the direction of said scanning lines are set parallel to each other.

4. A color image pickup system comprising:
    a color image pickup device for capturing a color image and outputting a color image signal;
    separate means for generating color separation image signals from said color image signal;
    an image pickup optical system for forming an object image on said image pickup device; and
    control means for shifting a pixel position of each color separation image signal outputted from said separate means so as to cancel a color shift of the corresponding color separation image caused by a decentered optical system, wherein:
        said image pickup optical system includes a decentered prism having at least a decentered, internally reflecting surface with power together with an entrance surface and an exit surface, which are transmitting surfaces, respectively, and
        said control means varies an amount of shift for each color separation image.

5. A color image display system comprising:
    generation means for generating color separation image signals,
    control means for shifting a display position of color separation images caused by said color separation image signals,
    a color image display device for displaying a color image, and
    a viewing optical system for forming an image of said color image on an observer side, wherein:
        said viewing optical system formed of a decentered optical system including a decentered prism having at least a decentered, internally reflecting surface with a power, together with an entrance surface and an exit surface, which are transmitting surfaces, respectively, and
        said control means varies an amount of shift for each color separation image so as to cancel a color shift of the corresponding color separation image caused by the decentered optical system.

6. A color image pickup system comprising:
    an image pickup optical system for forming an object image,
    an image pickup apparatus including an image pickup device disposed at a position that said object image is to be formed, and outputting color separation image signals, and outputting color separation image signals, and
    control means for providing position information that includes an amount of shift with respect to said color separation image signals, wherein:

said image pickup system formed of a decentered optical system including a decentered prism having at least a decentered, internally reflecting surface with a power, together with an entrance surface and an exit surface, which are transmitting surfaces, respectively, and said control means varies an amount of shift for each color separation image signal so as to cancel a color shift of the corresponding color separation image caused by the decentered optical system.

* * * * *